United States Patent [19]

Koyama et al.

[11] Patent Number: 4,689,756
[45] Date of Patent: Aug. 25, 1987

[54] ROBOT INTERPOLATION CONTROL METHOD

[75] Inventors: Hideo Koyama, Takarazuka; Takahiro Asano, Kobe; Fumio Noguchi, Takarazuka; Shigeki Fujinaga, Minomo, all of Japan

[73] Assignee: Shin Meiwa Industry Co., Ltd., Hyogo, Japan

[21] Appl. No.: 744,601

[22] Filed: Jun. 14, 1985

[30] Foreign Application Priority Data

Jun. 29, 1984 [JP] Japan .............................. 59-136183
Jul. 3, 1984 [JP] Japan .............................. 59-137460

[51] Int. Cl.⁴ ...................... G06F 15/46; G05B 19/42
[52] U.S. Cl. .................................... 364/513; 318/573; 364/169; 901/2; 901/20
[58] Field of Search ........................ 364/513, 167–171, 364/191–193, 474, 475; 318/568, 573; 901/2, 3–6, 9, 20; 414/730

[56] References Cited

U.S. PATENT DOCUMENTS

| 4,086,522 | 4/1978 | Engelberger et al. | 364/513 X |
| 4,338,672 | 7/1982 | Perzley et al. | 364/193 X |
| 4,453,221 | 6/1984 | Davis et al. | 364/191 X |
| 4,506,335 | 3/1985 | Magnuson | 364/169 X |
| 4,528,632 | 7/1985 | Nio et al. | 364/169 |
| 4,538,233 | 8/1985 | Resnick et al. | 364/169 X |

Primary Examiner—Joseph Ruggiero
Attorney, Agent, or Firm—Armstrong, Nikaido, Marmelstein & Kubovik

[57] ABSTRACT

Velocity, at which a work point of a robot passes through respective reference points, has previously been given magnitude and directions dependent on a relative positional relation between a plurality of continuous reference points. The work point passes through the respective reference points. Between adjacent reference points, interpolation arithmetic is performed along the above condition, whereby the work point defines a smooth locus in accordance with the result of the arithmetic.

11 Claims, 14 Drawing Figures

ROBOT INTERPOLATION CONTROL METHOD

BACKGROUND OF THE INVENTION

1. Field of the Invention

The present invention relates to a robot control method, and more particularly, it relates to a robot control method with improved interpolation control.

2. Description of the Prior Art

In a case where a robot is controlled by, e.g., a playback system, a control unit only stores information on discrete teaching points or reference points and hence it is required to perform control by interpolating information on, e.g., positions of the teaching points.

In order to perform such a interpolation, provided in the art are well-known linear interpolation and circular interpolation methods. These interpolation methods are characterized in that the arithmetic is relatively simple, whereas generally smoothness cannot be obtained with respect to loci other than those adapted to the respective interpolation methods (e.g., a straight line or a curve having a large radius of curvature).

The inventors have already proposed a technique of applying geometrical design argorithm algorithm proposed by Prof. Mamoru Hosaka et al. of Tokyo University to interpolation control of a robot. Such a technique is disclosed in, e.g., Japanese patent laying-open gazette No. 52408/1981, and Hosaka's algorithm itself is disclosed in "Information Processing" Vol. 17, No. 12, pages 1120 to 1127, December 1976, published by Ohmsha Ltd., Tokyo, Japan. This technique is hereafter described within the scope required for the following description of the present invention.

The interpolation by Hosaka's algorithm (hereinafter referred to as "Hosaka's interpolation") is based on a technical idea of taking an interpolation curve as a set of subcurves (called "curved line segments") corresponding in number to teaching points or reference points and performing specific averaging operation on adjacent ones of the curved line segments, thereby to obtain a smooth interpolation curve. In this method, linear interpolation is made between adjacent position vectors $\vec{R}_i$ and $\vec{R}_{i+1}$ of position vectors $\vec{R}_i$ (i=1, 2, ... m) of the reference points thereby to obtain a first stage interpolation curve $C_1$, as shown in FIG. 1. In this interpolation curve (polygonal line) $C_1$, the curved line segment connecting $\vec{R}_i$ and $\vec{R}_{i+1}$ is parameter-indicated as $\vec{D}_{i,1}(u)$ by a parameter u ($0 \leq u \leq 1$). The subscript i in symbol $\vec{D}_{i,1}(u)$ is indicative of the i-th order curved line segment (also called as "connector element"), and the other subscript 1 is indicative of that the curved line segment is obtained by the first stage interpolation (similar conditions are applied to other symbols). After the first stage interpolation curve is thus defined, repeatedly employed is the following recurrence formula:

$$\vec{D}_{i,k}(u) = \left[ \int_u^1 d\tau \cdot \omega(\tau) \vec{D}_{i,k-1}(\tau) + \int_0^u dt \cdot \omega(\tau) \vec{D}_{i+1,k-1}(\tau) \right] / \left[ \int_u^1 d\tau \cdot \omega(\tau) + \int_0^u d\tau \cdot \omega(\tau) \right] \quad (1)$$

$(k = 1, 2, \ldots)$ whereby an n-th stage curved line segment $\vec{D}_{i,n}(u)$ is found to obtain a desired n-th stage interpolation curve $C_n$ as a set of $\vec{D}_{i,n}(u)$. In the expression (1), the symbol $\omega(\tau)$ indicates a weight function.

The meaning of the expression (1) may be more clearly understood with reference to FIG. 2. Namely, within i-th order and (i+1)-th order connector elements $\vec{D}_{i,k-1}(u)$ and $\vec{D}_{i+1,k-1}(u)$ belonging to a (k−1)-th stage interpolation curve $C_{k-1}$ as shown in FIG. 2, portions $L_i$ and $L_{i+1}$ positioned between points $\vec{D}_{i,k--1}(u)$ and $\vec{D}_{i-1,k-1}(u)$ which correspond to a specific parameter u (e.g., $u_1$) and a boundary point $\vec{R}^{k-1}$ thereof are fetched or retrieved in the first place. Then a weighted mean operation is performed on positions of respective points on the portions $L_i$ and $L_{i+1}$ by employing the weight function $\omega(\tau)$. The pseudo-center of mass thus obtained is set as a point $\vec{D}_{i,k}(u)$ in a curved line segment $\vec{D}_{i,k}(u_1)$ in a k-th stage. Such an operation is performed on respective values of the parameter u, thereby to obtain the entire values of $\vec{D}_{i,k}(u)$.

FIG. 3 illustrates the respective curved line segments in the respective stages obtained from the connector elements by arrows, in which symbol (i,n) indicates $\vec{D}_{i,n}(u)$, and a similar condition is applied to other symbols. In FIG. 3, for example, an arrow AR indicates that $\vec{D}_{i,n}(u)$ is obtained from $\vec{D}_{i,n-1}(u)$ and $\vec{D}_{i+1,n-1}(u)$. As obvious from FIG. 3, $\vec{D}_{i,n}(u)$ is ultimately obtained from $\vec{R}_{i+j}(j=0, 1 \ldots n)$, and since the expression (1) is a linear recurrence formula, $\vec{D}_{i,n}(u)$ can be expressed as linear combination of $\vec{R}_{i+j}(j=0, 1 \ldots, n)$ as follows:

$$\vec{D}_{i,n}(u) = \sum_{j=0}^{n} \vec{R}_{i+j} f_{j,n}(u) \quad (2)$$

$$\vec{D}_{i,0}(u) = \vec{R}_i f_{00}(u), f_{00}(u) = 1 \quad (3)$$

The coefficient $f_{j,n}(u)$ can be expressed as a polynomial of u by practically calculating the expression (1), whereas detailed description is herein omitted.

An important point of the expression (2) is that respective curved line segments in the n-th stage are formed by retrieving information on continuous (n+1) teaching points $\vec{R}_{i+j}(j=0, 1, 2, \ldots, n)$ Therefore, in a case where, e.g., an interpolation curve $C_3$ obtained in the third stage is employed as the interpolation curve in an actual control operation, interpolation is performed while retrieving position information on four sequential reference points.

Thus, Hosaka's interpolation is provided in consideration of global geometric properties in the chain of teaching points, thereby to obtain a more smooth interpolation curve in comparison with linear interpolation and circular interpolation.

However, Hosaka's interpolation has several disadvantages, such as that the obtained interpolation curve does not pass reference points in general. Therefore, computational teaching point (called "reference point") $\vec{P}_i$ is defined by the following expression (4), so that the interpolation curve to be obtained passes all of the teaching points:

$$\vec{R}_i = \sum_{j=0}^{n} \vec{P}_{i+j} f_{j,n}(u) \quad (4)$$

$(i = 1, 2, \ldots)$

The aforementioned interpolation curve must be found on the basis of the reference point $\vec{P}_i$ obtained by solving the simultaneous equations. Hosaka's interpolation requires such a procedure, i.e., inverse transformation, whereby calculation steps are increased.

Further, the parameter in Hosaka's interpolation is a space parameter introduced for the purpose of parameter-indication of a respective one of the curved line segments, and hence its correspondence to the actual time is not clear. Therefore, an additional step of determining a functional form indicative of correspondence between the parameter u and the time for respective one of the curved line segments is required.

Further, when an interpolation curve in an n-th stage, for a considerably large value of n, is employed in order to smooth the interpolation curve, in a case where teaching is made with respect to a locus whose geometric property is abruptly changed, e.g., from a circle to a straight line, the position command value for the robot cannot follow such a change due to remaining memory of the locus in the time zone ahead of the time of changing. With respect to this problem, a means for performing Hosaka's interpolation may be invalidated in a position where the locus is greatly changed in a geometric manner, as described in, e.g., Japanese patent laying-open gazette No. 125406/1982. However, if there is obtained an interpolation method which can follow such a change while securing sufficient smoothness, the aforementioned invalidation may not be frequently employed, or no such invalidation is required according to the circumstances.

Further, there is a problem in starting/stopping. When a conventional robot control method is to control a robot having a high inertial load such as a large size robot and a composite robot, servo gains for respective control shafts are largely set in order to secure highly accurate positioning. However, impact to the robot is increased in starting and stopping. When the respective control shafts are made sufficiently rigid against the impact to cope with the problem, the respective components are inevitably increased in weight, leading to further increase of the servo gains. After all, it is difficult to ease the impact. Thus, awaited is provision of interpolation control which can ease impact in starting/stopping.

SUMMARY OF THE INVENTION

The present invention is directed to a robot control method for movement of the work point of a robot having a driving mechanism to pass through prescribed discrete passage points in a prescribed sequence.

The robot control method according to the present invention includes a step of preparing position data expressing respective positions of passage points and velocity data expressing the magnitude of the velocity of the work point in the respective ones of the passage points, a step of finding interpolation data on the basis of conditions that the work point passes through the passage points at velocity having a magnitude dependent on the velocity data and directions dependent on relations between data respectively expressing a plurality of passage points sequentially along the prescribed sequence and a step of outputting a command signal to the driving mechanism on the basis of the interpolation data.

In one aspect of the present invention, the interpolation data are determined on the basis of a positional interpolation function expressed as third or higher order polynomial with respect to a time parameter.

In another aspect of the present invention, when the velocity data in at least one of two adjacent passage points is substantially zero, interpolation is made between the two passage points on the basis of a condition that acceleration of the work point is changed in correlation to the distance from a prescribed position.

It is to be noted that the term "work point" employed with respect to the present invention indicates the position with which the robot performs an actual operation such as the forward end of the tool or the end effecter of the robot or the focus of laser beams of a laser fusing robot. Further, the term "passage point" includes starting and stopping points.

Accordingly, the principal object of the present invention is to provide a robot control method which can perform interpolation control retrieving global properties of a locus in a relatively simple structure.

Another object of the present invention is to provide a robot control method which has advantages of various conventional interpolation methods.

Still another object of the present invention is to provide a robot control method which can ease impact applied to the robot in starting and stopping.

These and other objects, features, aspects and advantages of the present invention will become more apparent from the following detailed description of the present invention when taken in conjunction with the accompanying drawings.

DESCRIPTION OF THE PREFERRED EMBODIMENTS

A.

Entire Structure and Operation of the Embodiment

Figure 1:
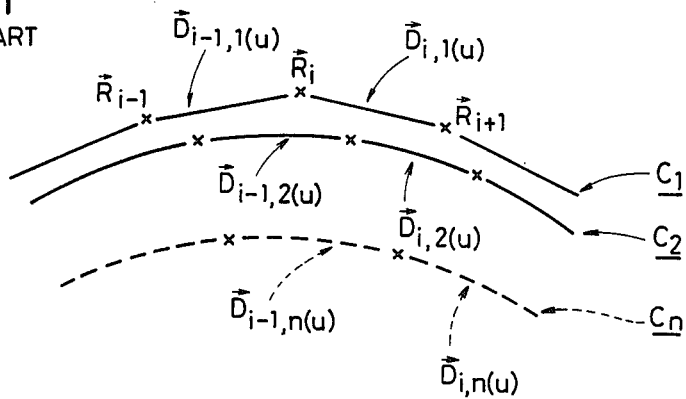
FIGS. 1 to 3 are illustrative of Hosaka's interpolation.
Figure 2:
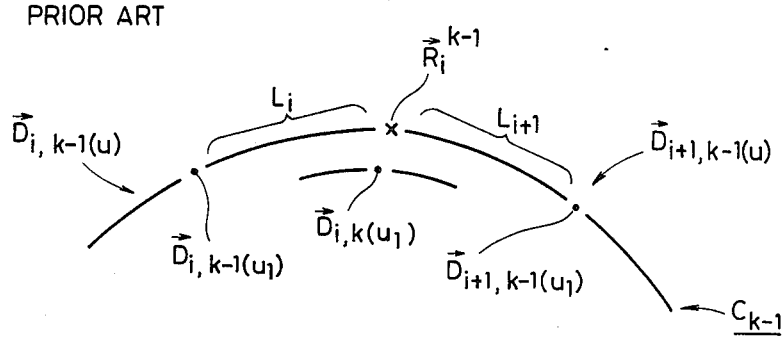
Figure 3:
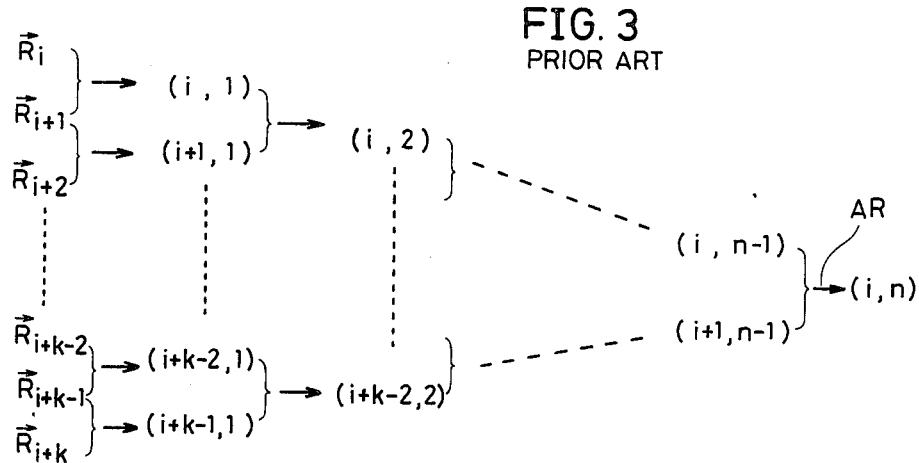
Figure 4:
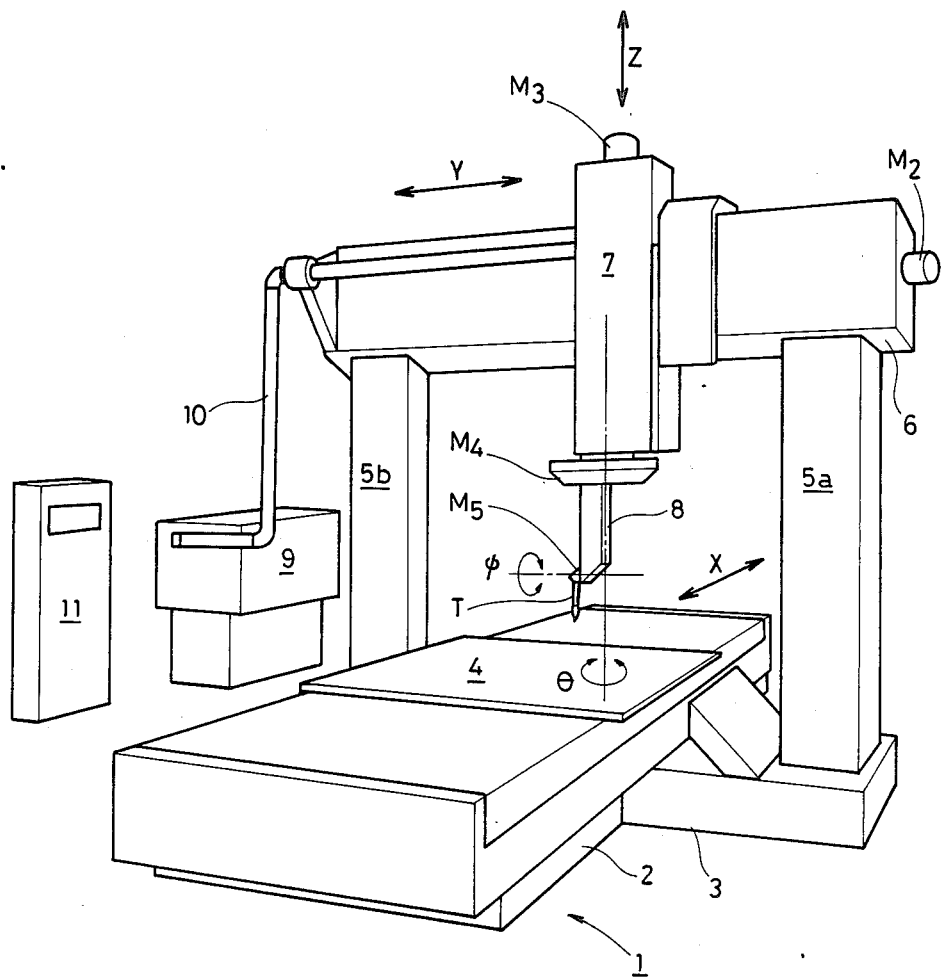
FIG. 4 is a general schematic diagram showing a system including a robot control unit implementing respective embodiments of the present invention.

FIG. 4 shows a robot controlled by a control method according to an embodiment of the present invention. It is to be noted here that, although a robot RB as shown in FIG. 4 is a cartesian coordinate laser fusing robot, the control method according to the present invention is also applicable to other types of robots such as welding and assembling robots of various types of coordinate or articulated type.

The robot RB has a platform 1, which is provided with a workbench 2 extending in the horizontal direction, i.e., in the direction X as shown in FIG. 4 and supports 3 extending from both side portions of the workbench 2 perpendicularly to the direction X. Placed on the workbench 2 is a moving table 4 movable along the direction X, which is driven by a motor $M_1$ (not shown) to reciprocatingly move in the direction X. A pair of columns 5a and 5b are upwardly provided on the supports 3 in a parallel manner with each other, and a beam 6 is arranged between the top portions of the columns 5a and 5b to extend in the direction Y as shown in FIG. 4. Mounted to the beam 6 is a moving column 7 extending in the vertical direction, i.e., the direction Z as shown in FIG. 4, to be movable along the direction Y. A motor $M_2$ serves as a power source for reciprocatingly moving the movable column 7 in the direction Y. A motor $M_3$ is provided on the upper portion of the movable column 7, to vertically move a motor $M_4$ provided in the lower end of the moving column 7 in the direction Z. An arm 8 extending in the direction Z is mounted to lower portion of the motor $M_4$ at a position deviating from the axis of rotation of the motor $M_4$, to be rotated in the direction $\theta$ as shown in FIG. 4 following rotation of the motor $M_4$. Provided in the lower side portion of the arm 8 is a motor $M_5$ having a laser torch T, which is swingingly rotated in the direction $\psi$ as shown in FIG. 4 by rotation of the motor $M_5$. The motors $M_1$ to $M_5$ are respectively provided with encoders $E_1$ to $E_5$ (not shown) for encoding angles of rotation of the respective motors.

A laser oscillator unit 9 oscillates laser beams having sufficient power required for a fusing operation, and is capable of supplying the laser beams to the laser torch T through a laser guide pipe 10. A control unit 11 controls the robot RB and the laser oscillator unit 9 along the embodiment of the present invention.

Figure 5:
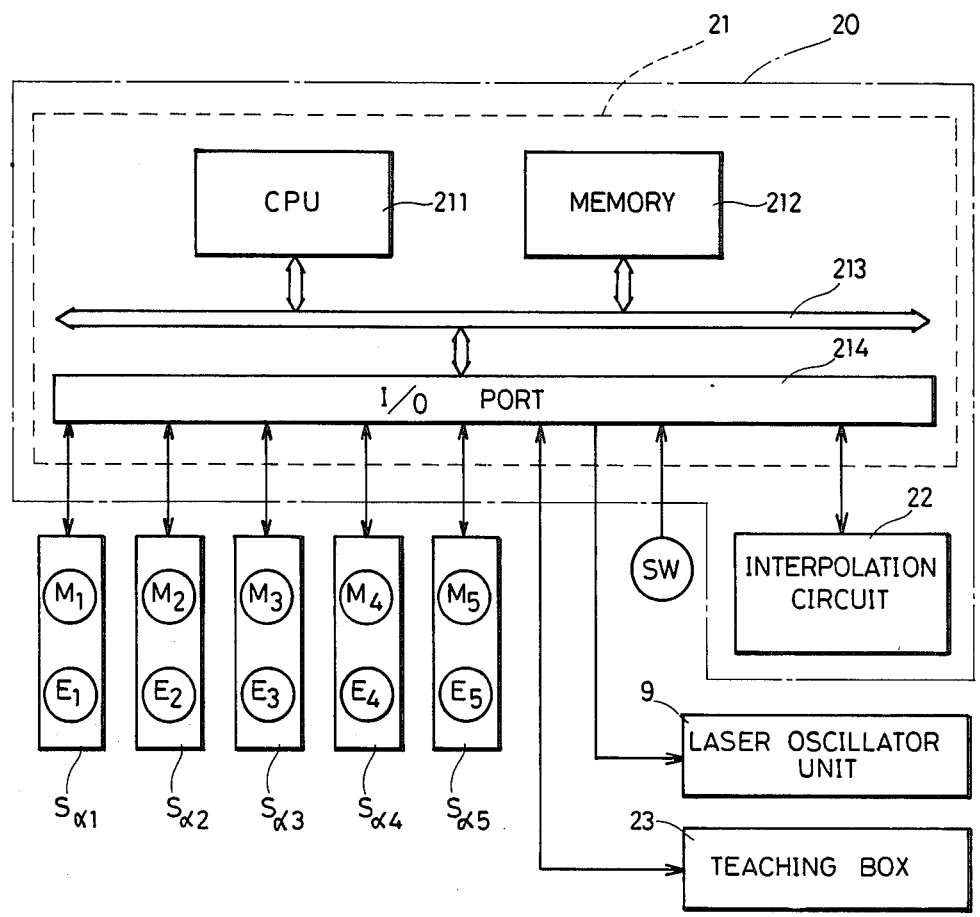
FIG. 5 illustrates the entire structure of a control circuit included in the robot control unit as shown in FIG. 4.

FIG. 5 is illustrative of a control circuit 20 included in the aforementioned control unit 11. The control circuit 20 includes, e.g., a microcomputer 21 as a main control circuit. The microcomputer 21 comprises a CPU 211, a memory 212 and an I/O port 214 which are connected with each other by a bus 213. The control circuit 20 further includes an interpolation circuit 22 which is connected with the interior of the microcomputer 21 through the I/O port 214. The interpolation circuit 22 is to perform interpolation arithmetic between teaching points or reference points as hereinafter described in detail. The interpolation circuit 22 may be provided as a dedicated circuit as shown in FIG. 5, or may be omitted in case where such interpolation arithmetic is performed in the microcomputer 21 on the basis of stored programs.

The I/O port 214 is further connected with servo systems $S_{\alpha 1}$ to $S_{\alpha 5}$ respectively including respective pairs of the aforementioned motors $M_1$ to $M_5$ and encoders $E_1$ to $E_5$, a teaching box 23, a teaching switch SW and the laser oscillator unit 9. The teaching box 23 is provided with a mode changeover switch (not shown) for switching teaching, test and playback modes and an input switch (not shown) for inputting various control conditions. The teaching switch SW is so pressed that the microcomputer 21 retrieves data from the encoders $E_1$ to $E_5$ as teaching data or reference data.

In order to make the robot RB as shown in FIG. 4 perform playback operation, a workpiece (not shown) is fixed on the moving table 4. Thereafter the teaching box 23 is so operated that the robot RB enters the playback mode. Then the CPU 211 sequentially reads the reference data as discrete passage points stored in the memory 212, thereby to supply the same to the interpolation circuit 22 through the bus 213 and the I/O port 214. The interpolation circuit 22 is of such a structure and operates as hereinafter described in detail. The circuit 22 performs interpolation arithmetic on the basis of the input reference data thereby to output a command signal on the basis of obtained interpolation command values to the motors $M_1$ to $M_5$ serving as driving mechanisms. The motors $M_1$ to $M_5$ rotate on the basis of the interpolation command values, whereby the forward end of the laser torch T defines a locus formed by connecting the sequent passage points along the prescribed sequence, while changing its relative position and relative velocity with respect to the workpiece. Simultaneously with this, the CPU 211 supplies an output control signal to the laser oscillator unit 9, which in turn fixes its laser output at a prescribed output level or changes the same if necessary. In such an operation, the laser beams from the laser torch T are irradiated to the workpiece thereby to fuse the workpiece along a desired locus.

B.

Principle of Interpolation Control

Description is now made on the principle of interpolation executed in the aforementioned control circuit 20 with reference to a definite example. Considering, e.g., a control unit for a playback robot, previously calculated or programmed are positional data on reference points serving as discrete passage points, e.g., respective components of sequent position vectors $\vec{x}_i (i=1, 2 \ldots, m$, m: integral) and the magnitude of the passage velocity $u_i$ at which the work point sequentially passes the reference points. Assuming that the interpolation function for positions interpolating the links of the position vectors $\vec{x}_i (i=1, 2, \ldots, m)$ is expressed by $\vec{x}(t)$ as the function of time t, consideration is made on the interpolation function established per section of interpolation, as an example of the value $\vec{x}(t)$ satisfying conditions of the present invention, as follows:

$$\vec{x}(t) = \vec{u}_i \frac{(T_i - t)^2 t}{T_i^2} + (\vec{x}_{i+1} - \vec{x}_i) \frac{(3T_i - 2t)t^2}{T_i^3} + \vec{u}_{i+1} \frac{(t - T_i)t^2}{T_i^2} + \vec{x}_i \quad (5)$$

Figure 6:
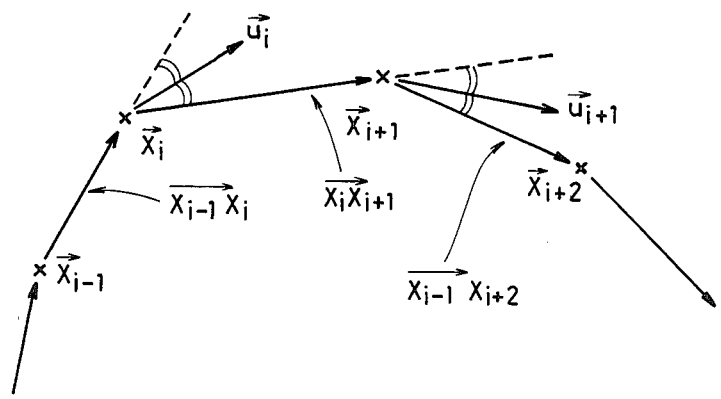
FIG. 6 is a diagram for illustrating the principle of an interpolation method applied to first to third embodiments of the present invention.

$(i = 1, 2, \ldots, m)$ in which symbol $\vec{u}_i$ represents a vector defined to have the magnitude $u_i$ and a direction intermediate between the directions of vectors $\overrightarrow{x_{i-1}x_i}$ and $\overrightarrow{x_ix_{i-1}}$, as shown in FIG. 6. Namely, the vectors $\vec{u}_i$ and $\vec{u}_{i-1}$ are expressed as follows:

$$\frac{\vec{u}_i}{u_i} = \left( \frac{\vec{x}_i - \vec{x}_{i-1}}{||\vec{x}_i - \vec{x}_{i-1}||} + \frac{\vec{x}_{i+1} - \vec{x}_i}{||\vec{x}_{i+1} - \vec{x}_i||} \right) \bigg/ \left|\left| \frac{\vec{x}_i - \vec{x}_{i-1}}{||\vec{x}_i - \vec{x}_{i-1}||} + \frac{\vec{x}_{i+1} - \vec{x}_i}{||\vec{x}_{i+1} - \vec{x}_i||} \right|\right| \quad (6)$$

$$\vec{u}_{i+1} = \left( \frac{\vec{x}_{i+1} - \vec{x}_i}{||\vec{x}_{i+1} - \vec{x}_i||} + \frac{\vec{x}_{i+2} - \vec{x}_{i+1}}{||\vec{x}_{i+2} - \vec{x}_{i+1}||} \right) \Big/ \left|\left| \frac{\vec{x}_{i+1} - \vec{x}_i}{||\vec{x}_{i+1} - \vec{x}_i||} + \frac{\vec{x}_{i+2} - \vec{x}_{i+1}}{||\vec{x}_{i+2} - \vec{x}_{i+1}||} \right|\right| \quad (7)$$

, where the symbol $||\ \ ||$ represents the norms of the vectors therebetween.

Although $\vec{x}_{i-1}$ is not defined at i=1, i.e., the starting point, it may be set at any appropriate value, e.g., as follows:

$$\vec{x}_{i-1} = \vec{x}_i - (\vec{x}_{i+1} - \vec{x}_i) \quad (8)$$

The expression (8) is under the condition that $\vec{x}_{i-1}$ is positioned opposite to $\vec{x}_{i+1}$ with respect to $\vec{x}_i$. Symbol $T_i$ represents the period required for movement of the work point from $\vec{x}_i$ to $\vec{x}_{i+1}$, and is expressed as follows:

$$T_i = ||x_{i+1} - x_i|| \Big/ \frac{(u_i + u_{i+1})}{2} \quad (9)$$

The time t in the above expression (5) is measured when the work point passes $\vec{x}_i$ at the time t=0, and is therefore reset to zero every time the work point passes the respective one of $\vec{x}_i$ (i=1, 2, ..., m). If the time is to be expressed by $t_a$ over the entire locus, a substitution may be made as follows:

$$t \rightarrow t_a - \sum_{j=1}^{i-1} T_j \quad (10)$$

It can be readily confirmed that $\vec{x}(t)$ in the expression (5) satisfies the conditions forming the basis of the present invention. In fact, assuming that t=0, the expression (5) is expressed respectively as follows:

$$\vec{x}(0) = \vec{x}_i \quad (11)$$

$$\vec{x}(T_i) = \vec{x}_i + (\vec{x}_{i+1} - \vec{x}_i) = \vec{x}_{i+1} \quad (12)$$

Using $(d/dt)\vec{x}(t) = \vec{v}(t)$, the following expression (13) is obtained from the expression (5):

$$\vec{v}(t) = \vec{u}_i \frac{(T_i - t)^2}{T_i^2} + \vec{w}_i \frac{(T_i - t)t}{T_i^2} + \vec{u}_{i+1} \frac{t^2}{T_i^2} \quad (13)$$

in which $w_i$ is defined as follows:

$$\vec{w}_i = \frac{6}{T_i}(\vec{x}_{i+1} - \vec{x}_i) - 2(\vec{u}_i + \vec{u}_{i+1}) \quad (14)$$

Therefore, when t=0 and $T_i$, the following expressions are obtained, respectively:

$$\vec{v}(0) = \vec{u}_i \quad (15)$$

$$\vec{v}(T_i) = \vec{u}_{i+1} \quad (16)$$

As obvious from the expression (6), $\vec{u}_i$ and $\vec{u}_{i+1}$ are defined by the relation between $\vec{x}_{i-1} - \vec{x}_{i+2}$, and hence the interpolation function obtained by the expression (5) forms an example of satisfying the conditions forming the basis of the present invention.

The properties of the interpolation function in the above expression (5) are now described in further detail.

Since the interpolation function in the expression (5) is a cubic (third order) polynomial with respect to the time t, it includes four coefficients, when made on t. Therefore, in another viewpoint of the expression (5), the four coefficients included in the cubic polynomial with respect to the time t may be considered as specified by two conditions for passing the work point through reference points on both ends of the section of interpolation and two conditions for rendering the directions of the velocity at the reference points on both ends dependent upon the relations between the positions of the reference points.

It is to be noted here that the direction of velocity $\vec{v}(t)$ at reference point $\vec{x}_i$ is intermediate between the respective directions of vectors $\overrightarrow{x_{i-1}x_i}$ and $\overrightarrow{x_ix_{i+1}}$. By virtue of a condition, the interpolation function between the reference points $\vec{x}_i$ and $\vec{x}_{i+1}$ retrieves positional data on respective ones of two adjacent teaching points $\vec{x}_{i-1}$ and $\vec{x}_{i+2}$ positioned in the exterior of the section. In other words, the relatively simple function in the expression (5) reflects global properties of the locus for movement of the work point.

Further, by virtue of presence of such a condition, the entire interpolation function obtained by linking those found by the expression (5) for the respective ones of i=1, 2, 3, ..., m is smooth in position and velocity in respective reference points. Since the position is the cubic function with respect to the time t, differential coefficients of $\vec{x}(t)$ with respect to t exceeding the fourth order are always $\vec{0}$, and hence continuity is also present.

Further, as obvious from general properties of a polynomial, the interpolation function in the expression (5) can correctly express both the linear and curved portions. Therefore, when $\vec{x}_i - \vec{x}_{i+3}$, which is smooth in position, and velocity are distributed on a line, there are obtained interpolation functions extremely approximate to linear interpolation. Further, when $\vec{x}_i - \vec{x}_{i+3}$ are present on one circumference, there are obtained interpolation functions extremely approximate to circular interpolation.

In the interpolation function of the above expression (5), behavior at reference points in which $u_i = 0$, i.e., at the starting and stopping points comes into question. Therefore, the expression (5) is differentiated twice with respect to the time t, thereby to express acceleration $\vec{a}(t)$ as follows:

$$\vec{a}(t) = (-2\vec{u}_i + \vec{w}_i) + 2(\vec{u}_i - \vec{w}_i + \vec{u}_{i+1}) \cdot \frac{t}{T_i} \quad (17)$$

When t=0 and $u_i=0$ in the above expression (17), obtained is:

$$\vec{a}(0) = \vec{w}_i \Big|_{u=0} = \frac{6}{T_i}(\vec{x}_{i+1} - \vec{x}_i) - 2\vec{u}_{i+1} \quad (18)$$

Namely, the direction of acceleration $\vec{a}(t)$ is defined also at the point t=0, $u_i=0$, i.e., at the starting point, whereby recognized is that the interpolation function of the expression (5) can be employed also for a locus including the starting point. Stopping movement is also completely defined similarly at the stopping point.

Although the principle of interpolation employed in the present invention is described with respect to the expression (5) in the foregoing description, it is as a matter of course possible to employ functional forms other than the expression (5). With respect to $\vec{x}(t)$, for example, the conditions required for the present invention can be satisfied by higher order polynomials exceeding the third order with respect to t or functions of the time t including at least four coefficients other than polynomials. When the fourth or higher order polynomials are employed, the interpolation function can be effected to smoothly link acceleration. In addition to the reference points $\vec{x}_{i-1}$ and $\vec{x}_{i+2}$ adjacent to the noted interpolation sections $\vec{x}_i$-$\vec{x}_{i+1}$, further, it may be possible to retrieve information on farther reference points.

Thus, the interpolation function corresponding to the conditions of the present invention is as advantageous in its global properties and smoothness as the aforementioned Hosaka's interpolation. On the other hand, the present invention requires no complicated procedures by determinating a on corresponding relation to time and inverse transformation taken in Hosaka's interpolation, whereby interpolation control is enabled by simple functions substantially similar to linear interpolation and circular interpolation. In this regard, the interpolation method satisfying the conditions of the present invention also presents advantages of those conventional interpolation methods.

C.

Details of First Embodiment

The first embodiment of the present invention is now described in detail with respect to the case where the aforementioned expression (5) is employed as the basis for interpolation control. For such an interpolation control, for example, the control circuit 20 as shown in FIG. 5 may perform direct arithmetic of the expression (5) on the basis of positional data $\vec{x}_1$ and velocity data $u_i$ of the respective reference points within the same thereby to output command values corresponding to the results of the arithmetic to the respective motors $M_1$ to $M_5$ of the robot RB. Although such a method is sufficiently effective, introduced herein is a method of performing the interpolation arithmetic at a higher speed, and description is now made on control along the same method.

First, the expressions (5), (13) and (17) are rearranged as follows:

$$\vec{x}(t) = \vec{x} = \vec{x}_i + \vec{u}_i T_i \left(1 - \frac{t}{T_i}\right)^2 \left(\frac{t}{T_i}\right) + \quad (19)$$

$$(\vec{x}_{i+1} - \vec{x}_i)\left(3 - 2\frac{t}{T_i}\right)\left(\frac{t}{T_i}\right)^2 + \vec{u}_{i+1}T_i\left(\frac{t}{T_i} - 1\right)\left(\frac{t}{T_i}\right)^2$$

$$\vec{v}(t) = \vec{v} = \frac{d\vec{x}}{dt} = \vec{u}_i + (-2\vec{u}_i + \vec{w}_i)\left(\frac{t}{T_i}\right) + \quad (20)$$

$$(\vec{u}_i - \vec{w}_i + \vec{u}_{i+1})\left(\frac{t}{T_i}\right)^2$$

$$\vec{a}(t) = \vec{a} = (-2\vec{u}_i + \vec{w}_i)\frac{1}{T_i} + 2(\vec{u}_i - \vec{w}_i + \vec{u}_{i+1})\frac{t}{T_i^2} \quad (21)$$

Further, the differential $\vec{\beta}(t)$ of acceleration with respect to the time t is:

$$\vec{\beta}(t) = \vec{\beta} = \frac{d\vec{a}}{dt} = 2(\vec{u}_i - \vec{w}_i + \vec{u}_{i+1})\frac{1}{T_i^2} \quad (22)$$

Namely, the value $\vec{x}$ in the expression (19) is obtained by integrating the differential equations (20) to (22) under the following initial conditions:

$$a_{ini} = \frac{1}{T_i} \cdot (-2\vec{u}_i + \vec{w}_i) \quad (23)$$

$$\vec{v}_{ini} = \vec{u}_i \quad (24)$$

$$\vec{x}_{ini} = \vec{x}_i \quad (25)$$

In a case where the differential equations (20) to (22) are directly solved, the expression (19) must be calculated whereby required are a number of multiplications. Therefore, approximation is herein made to solve the expressions (19) to (22) by making additions, thereby to reduce calculating steps. In other words, infinitesimal time $\Delta t$ is introduced to approximate the aforementioned differential equations as follows:

$$\vec{x}_{new} = \vec{x}_{old} + \vec{v}_{old} \cdot \Delta t \quad (26)$$

$$\vec{v}_{new} = \vec{v}_{old} + \vec{a}_{old} \cdot \Delta t \quad (27)$$

$$\vec{a}_{new} = \vec{a}_{old} + \vec{\beta}_{old} \cdot \Delta t \quad (28)$$

$$\vec{\beta}_{new} = \vec{\beta}_{old} = 2(\vec{u}_i - \vec{w}_i + \vec{u}_{i+1}) \cdot (1/T_i^2) \quad (29)$$

in which the subscript "old" indicates the respective values obtained with respect to the forward time t while the subscript "new" indicates the respective values at the time $(t + \Delta t)$.

By such a transformation, new interpolation values can be approximately obtained by making additions of the aforementioned expressions (26) to (28) per $2^{-10}$ sec. when, for example, the value $\Delta t$ is set as $2^{-10}$ sec. Particularly when $\Delta t = 2^{-N}$ (N:integer) as in this embodiment, the second terms of the right hand sides of the respective expressions (26) to (28) can be calculated by merely shifting the values $\vec{v}_{old}$ etc. to the lower order sides by N bits, and hence the differential equations can be solved simply by shifting arithmetic and additions, without requiring multiplications. Thus, the arithmetic time is reduced by solving the differential equations only by shifting arithmetic and additions, whereby the arithmetic can be readily performed by dedicated hardware.

The additions of the expressions (26) to (28) are repeated by $[T_i/\Delta t]$ times (symbol [ ] is indicative of a Gaussian symbol for truncating a decimal part), and thereafter information on a subsequent teaching point is retrieved to newly start repetition of the additions. Therefore, cumulative error is less than 1 digit in the aforementioned case. This error, caused by approximation, can be substantially disregarded in practice.

D.
Structure and Operation of Interpolation Circuit 22 in First Embodiment The arithmetic based on the definite example of the aforementioned interpolation method is performed by the interpolation circuit 22 as shown in FIG. 5. The interpolation circuit 22 is shown in further detail in FIG. 7 in the form of a block diagram.

The interpolationn circuit 22 includes buffers 101 to 104 which are connected through the I/O port 214 and the bus 213 with the CPU 211 and the memory 212. The output from the buffer 101 for buffering the value of time differential $\tilde{\beta}$ of acceleration is input in an adder 105 for making additions with respect to acceleration $\tilde{a}$, while the output from the adder 105 is supplied to a buffer 106 which in turn buffers the value of acceleration $\tilde{a}$. The output from the buffer 106 is branched to two points, one output being supplied as the other input of the adder 105 and the other output being supplied to an adder 107 which makes additions with respect to velocity $\tilde{v}$. The output from the adder 107 is supplied to a buffer 108 for buffering the value of velocity $\tilde{v}$, and the output of the buffer 108 is supplied as the other input of the adder 107 and one input of an adder 109 which makes additions with respect to position $\tilde{x}$. The output from the buffer 108 is also supplied to the I/O port 214 through a line 111. The output from the adder 109 is supplied to a buffer 110 which buffers the value of position $\tilde{x}$. The output from the buffer 110 is branched to two points, one output being supplied as the other input of the adder 109 and the other supplied to the I/O port 214 through a line 112.

The aforementioned adders 105, 107 and 109 are respectively adapted to shift, within the respective two inputs thereof, those obtained as outputs from the front stage buffers 101, 106 and 108 by 10 bits to the lower order sides thereby to add up the same with the remaining inputs, i.e., the respective outputs from the rear stage buffers 106, 108 and 110. Therefore, assuming that the input from the respective front stage buffer is represented by $Q_1$ and the remaining input from the respective rear stage buffer is represented by $Q_2$, an additional output Q obtained by the aforementioned adders is expressed as follows:

$$Q = Q_2 + Q_1 \cdot 2^{-10} \tag{30}$$

The buffers 102 to 104 are respectively to set initial values of acceleration, velocity and position, and the outputs thereof are supplied to the buffers 106, 108 and 110 respectively. A clock generator 113 is to supply a clock signal $\phi$ to the buffers 106, 108 and 110, and includes a clock buffer 114 connected to the I/O port 214 and a counter 115 for receiving the output from the clock buffer 114 and the output from a timer 116 thereby to output the clock signal $\phi$.

The interpolation circuit 22 performs interpolation arithmetic on the basis of the expressions (26) to (29) in the following manner: First, the teaching box 23 (FIG. 5) is operated to enter the playback mode, whereby the CPU 211 calculates respective initial values $\tilde{\beta}_{ini}$, $\tilde{a}_{ini}$, $\tilde{v}_{ini}$ and $\tilde{x}_{ini}$ (refer to expressions (22) to (25)) of acceleration time differential, acceleration, velocity and position in one interpolation section on the basis of calculated or preprogrammed information stored in the memory 212, to supply the same to the buffers 101 to 104 respectively. Since $\tilde{\beta}$ is a constant in one interpolation section.

$$\tilde{\beta}_{ini} = \tilde{\beta} = 2(\overline{u}_i - \overline{w}_i + \overline{u}_{i+1}) \cdot (1/Ti^2) \tag{31}$$

In a parallel manner with the above, the value of infinitesimal time interval $\Delta t = 2^{-10}$ sec. is supplied from the memory 212 to the clock buffer 114. The initial values $\tilde{a}_{ini}$, $\tilde{v}_{ini}$ and $\tilde{x}_{ini}$ are respectively transferred to the buffers 106, 108 and 110, whereby the interpolation circuit 22 is initialized. On the other hand, the value $\Delta t$ is supplied to the counter 115, which in turn receives the timer outputs from the timer 116 to count the same, thereby to output a carry signal as the clock signal $\phi$ every time the counted value exceeds the level $\Delta t$.

In the first clock cycle, the initial value $\tilde{a}_{ini}$ of acceleration buffered in the buffer 106 is output to the adder 105. The adder 105 shifts the initial value $\tilde{\beta}_{ini}$ from the buffer 101 to the lower order side by 10 bits thereby to add up the same with $\tilde{a}_{ini}$. The output $\tilde{a}_{ini}$ from the buffer 106 is also supplied to the adder 107, which in turn shifts the value $\tilde{a}_{ini}$ to the lower order side by 10 bits thereby to add up the same with the value $\tilde{v}_{ini}$ output from the buffer 108. The output $\tilde{v}_{ini}$ from the buffer 108 is also supplied to the adder 109, which in turn shifts the value $\tilde{v}_{ini}$ to the lower order side by 10 bits thereby to add up the same with the value $\tilde{x}_{ini}$ output from the buffer 110. In a parallel manner with these operations, the respective outputs $\tilde{v}_{ini}$ and $\tilde{x}_{ini}$ from the buffers 108 and 110 are supplied to the I/O port 214 respectively as velocity command value and position command value. Subsequently, respective outputs from the adders 105, 107 and 109 are supplied to the rear stage buffers 106, 108 and 110, whereby the data stored in these buffers are updated.

Similarly in subsequent respective cycles of the clock $\phi$, the adders 105, 107 and 109 add up the values obtained by shifting the outputs from the front stage buffers 101, 106 and 108 to the lower order sides with the outputs from the rear stage buffers 106, 108 and 110 thereby to store the same in the rear stage buffers 106, 108 and 110. Respective data stored in the buffers 108 and 110 are output as velocity command value and position command value respectively.

Therefore, assuming that, with attention directed to a specific clock cycle, the data stored in the buffers 101, 106, 108 and 110 are respectively represented by $\tilde{\beta}_{old}(=\tilde{\beta}_{ini})$, $\tilde{a}_{old}$, $\tilde{v}_{old}$, and $\tilde{x}_{old}$ and those newly stored in the respective rear stage buffers 106, 108 and 110 of the adders 105, 107 and 109 as the results of the additions are represented by $\tilde{a}_{new}$, $\tilde{v}_{new}$ and $\tilde{x}_{new}$, the following expressions are obtained:

$$\tilde{x}_{new} = \tilde{x}_{old} + \tilde{v}_{old} \cdot 2^{-10} \tag{32}$$

$$\tilde{v}_{new} = \tilde{v}_{old} + \tilde{a}_{old} \cdot 2^{-10} \tag{33}$$

$$\tilde{a}_{new} = \tilde{a}_{old} + \tilde{\beta}_{old} \cdot 2^{-10} \tag{34}$$

$$\tilde{\beta}_{old} = \tilde{\beta}_{ini} \tag{35}$$

In consideration of the fact $\Delta t = 2^{-10}$, these expressions are identical to the aforementioned expressions (26) to (29). Therefore, the interpolated velocity command value and position command value are updated every cycle of the clock. When repetition in one interpolation section is made $[Ti/\Delta t]$ times, the interpolation circuit 22 is reset thereby to initiate interpolation arithmetic on the basis of new initial values. Such operations are repeated until a playback termination instruction is

E.

Second Embodiment

The interpolation arithmetic in the first embodiment is performed by the interpolation circuit 22 which is implemented as dedicated hardware, whereby high-speed interpolation arithmetic is enabled. However, such interpolation arithmetic can be performed in the CPU 211 thereby to omit the interpolation circuit 22.

Figure 8:
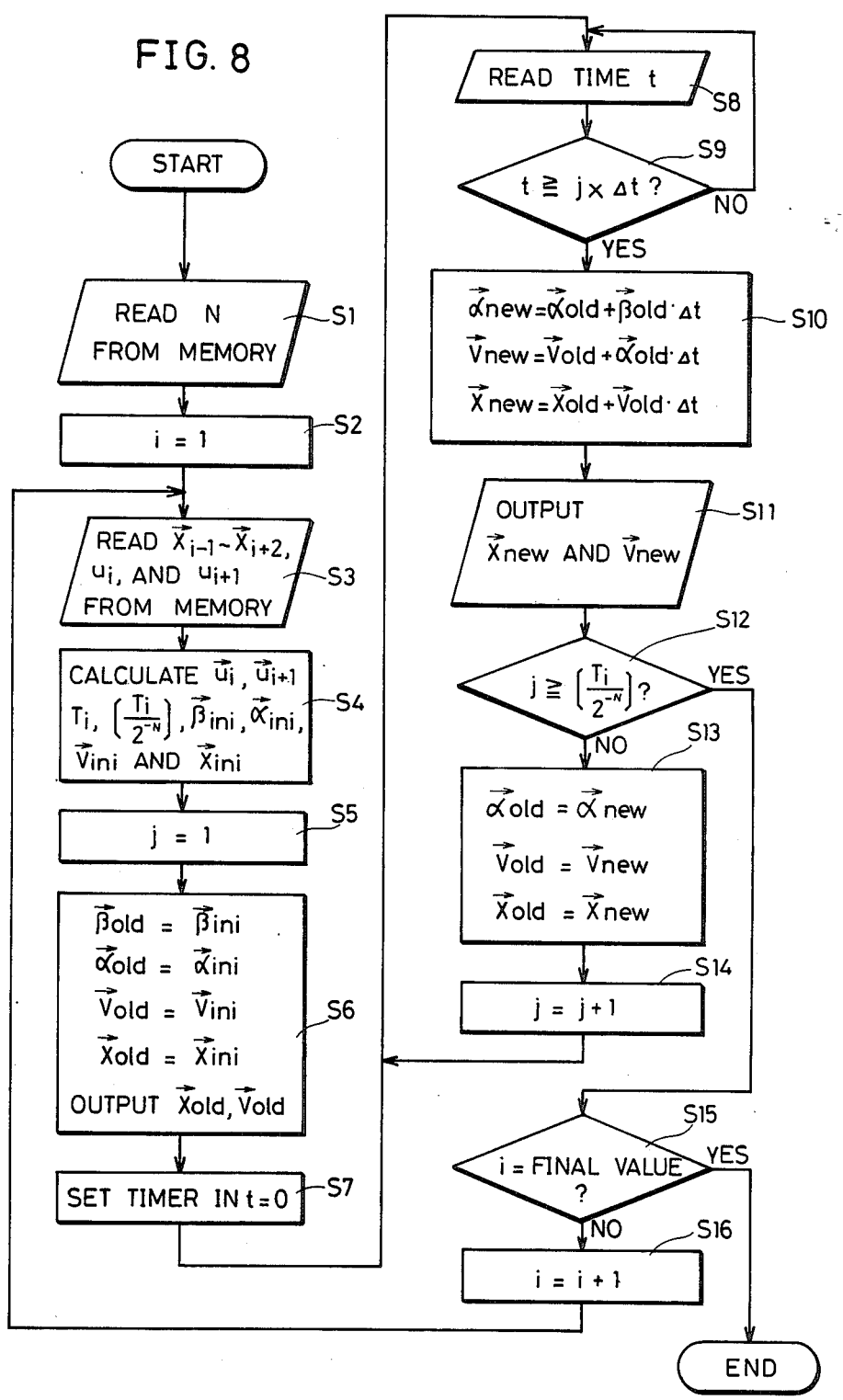
FIG. 8 is a flow chart for illustrating the second embodiment.

Therefore, description is now made on operations for performing the interpolation arithmetic by the CPU 211 with reference to a flow chart as shown in FIG. 8.

When the teaching box 23 is operated to enter the playback mode, the CPU 211 reads integral N from the memory 212 (step S1). Then the order i of the interpolation section is set equal to 1 (step S2), and the CPU 211 reads the teaching or reference data $\vec{x}_{i-1}$-$\vec{x}_{i+2}$, $u_i$ and $u_{i+1}$ from the memory 212 (step S3). Thereafter the values $\vec{u}_i$, $\vec{u}_{i+1}$, $T_i$, $[T_i/2^{-N}]$, $\vec{\beta}_{ini}$, $\vec{a}_{ini}$, $\vec{v}_{ini}$ and $\vec{x}_{ini}$ are calculated by employing the expressions (6), (7), (9), (23) to (25) and (31) (step S4). Interpolation repeating count number j is set equal to 1 (step S5), and the values $\vec{x}_{old}$, $\vec{v}_{old}$ and the like are defined by employing the respective initial values $\vec{x}_{ini}$, $\vec{v}_{ini}$ etc. while outputting the values $\vec{x}_{old}$ and $\vec{v}_{old}$ as position command value and velocity command value respectively (step S6).

An internal timer (not shown) of the CPU 211 is set at t=0 (step S7), and the time t is read at a step S8. When the time t is determined to be less than $j \times \Delta t$ at a next step S9, the process is returned to the step S8, whereas the values $\vec{x}_{new}$, $\vec{v}_{new}$ and the like are calculated by the expressions (26) to (29) (step 10) when the time is greater than $j \times \Delta t$. In order to multiply $\Delta t$ by $\vec{v}_{old}$ etc., the value $\vec{v}_{old}$ and the like may be shifted in the lower order sides by N bits. Thereafter the values $\vec{v}_{new}$ and $\vec{x}_{new}$ are output as velocity command value and position command value respectively (step S11). A determination is made as to whether or not j is greater than $[T_i/2^{-N}]$ (step S12), and if j is less than $[T_i/2^{-N}]$, the values $\vec{x}_{old}$, $\vec{v}_{old}$ etc. are newly defined by $\vec{x}_{new}$, $\vec{v}_{new}$ etc. (step S13). Thereafter the level j is newly defined by j+1 (step S14) thereby to return the process to the step S8. When $j \geq [T_i/2^{-N}]$, a determination is made as to whether or not i is the final interpolation section, i.e., whether or not the interpolation arithmetic has been performed to reach the final reference point (step S15), and in case i is not the final value, the value i is newly defined by i+1 (step S16) and the process is returned to the step S3. When i reaches the final value, the interpolation arithmetic is terminated.

F.

Third Embodiment

The aforementioned interpolation arithmetic based on the expression (5) can be independently performed by itself, whereas the same can be combined with other interpolation methods. As an example of such a combination, description is now made on a combination with other interpolation methods for smoothing operations in the vicinity of starting and stopping. The interpolation method based on the expression (5) is completely defined also in the starting and stopping points as hereinabove described, and hence it is not necessarily required to employ the same commonly with other interpolation methods directed to smooth starting and stopping, i.e., soft starting and soft stopping, whereas control in starting and stopping is further accurately facilitated by a combination as hereinafter described. Therefore, first described are newly formulated principles of soft starting and soft stopping thereby to describe the third embodiment of the present invention to be commonly employed with the principles.

Figure 9:
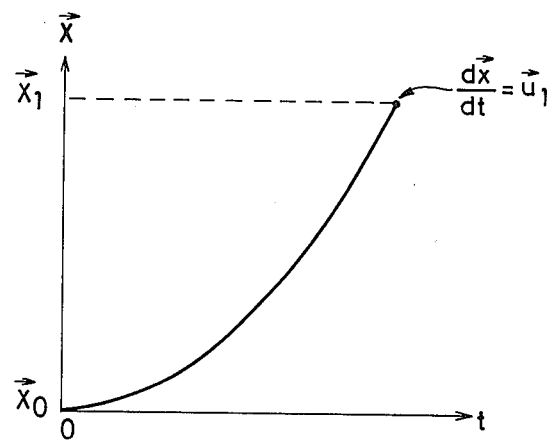
FIGS. 9 to 11 are diagrams for illustrating a method of soft starting and soft stopping employed in the third and fourth embodiments.

FIG. 9 is a diagram for illustrating the principle of soft starting, shown in which is such a condition that the work point stopped in $\vec{x}=\vec{x}_0$ at a time t=0 passes through $\vec{x}=\vec{x}_1$ with velocity $\vec{u}_1$.

Such a soft starting method is so formed that acceleration $\vec{a}(t)$ of the work point is correlated with the distance from a prescribed position, e.g., $\vec{x}_1$. Therefore, when a proportional relation is adopted as such a correlation, the following expression is employed as the basis:

$$\vec{a}(t) = \frac{d\vec{v}(t)}{dt} = k^2(-\vec{x} + \vec{x}_1) \qquad (36)$$

in which $\vec{v}(t)$ is representative of the velocity of the work point and k is a constant. When relation in the following expression (37) is substituted in the above expression (36), obtained is an expression (37'), which is a second order differential equation of position $\vec{x}(t)$ with respect to t:

$$\vec{v}(t) = \frac{d}{dt} \vec{x}(t) \qquad (37)$$

$$\frac{d^2}{dt^2} \vec{x}(t) + k^2 \vec{x}(t) = k^2 \vec{x}_1 \qquad (37')$$

The expression (37') can be easily solved, whereby the following expressions (38) and (39) are obtained:

$$\vec{x}(t) = (\vec{x}_0 - \vec{x}_1)\cos(kt) + \vec{x}_1 \qquad (38)$$

$$\vec{v}(t) = -k(\vec{x}_0 - \vec{x}_1)\sin(kt) \qquad (39)$$

in which:

$$\vec{u}_1 = -k(\vec{x}_0 - \vec{x}_1) \qquad (40)$$

$$kT = \pi/2 \qquad (41)$$

and T represents the time required for movement of the work point to reach $\vec{x}_1$. It is possible to directly perform arithmetic of the expressions (38) and (39) in order to control the soft starting, whereas employed here is a method of solving differential equations by repeating additions. Therefore, assuming that the expressions (37) and (37') are those for infinitesimal time interval $\Delta t$ and position and velocity of the work point at the time t are represented by $\vec{x}_{old}$ and $\vec{v}_{old}$ respectively while those at the time t+$\Delta t$ are represented by $\vec{x}_{new}$ and $\vec{v}_{new}$ respectively, the following expressions (42) and (43) are obtained:

$$(\vec{x}_{new} - \vec{x}_{old})/\Delta t = \vec{v}_{old} \qquad (42)$$

$$(\vec{v}_{new} - \vec{v}_{d\ old})/\Delta t = k^2(-\vec{x}_{old} + \vec{x}_1) \qquad (43)$$

By arranging the above expressions, the following expressions are obtained:

$$\vec{x}_{new} = \vec{x}_{old} + \vec{v}_{old} \cdot \Delta t \qquad (44)$$

$$\vec{v}_{new} = \vec{v}_{old} + k^2(-\vec{x}_{old} + \vec{x}_1) \cdot \Delta t \tag{45}$$

However, if the above expressions (44) and (45) are directly employed as the basis, multiplication of value $k^2$ is required in the right hand side of the expression (45).

Therefore, integral k' and infinitesimal time interval $\Delta t'$ are defined so as to establish the following expressions:

$$2^{k'} \cdot \Delta t' = k^2 \cdot \Delta t \tag{46}$$

$$\Delta t > \Delta t' > \Delta t/2 \tag{47}$$

whereby the second term in the right hand side of the expression (45) can be rewritten as follows:

$$2^{k'}(-\vec{x}_{old} + \vec{x}_1) \cdot \Delta t' = 2^{k'}(-\vec{x}_{old} + \vec{x}_1) \cdot \delta \cdot \Delta t \tag{48}$$

in which:

$$\delta \equiv \Delta t'/\Delta t \tag{49}$$

by performing such a transformation, multiplication of $k^2$ is replaced by that of $2^{k'}$ while, further, the multiplication of $2^{k'}$ can be replaced by shifting the multiplicand by k' bits to the higher order side. However, under the presence of factor $\delta \cdot \Delta t$, multiplication of $\delta$ in turn comes into question. In order to solve this, repeated arithmetic on velocity may be performed per $\Delta t/\delta$. In other words, when an increment by $2^{k'}(-\vec{x}_{old} + \vec{x}_1)\Delta t$ is added to $\vec{v}_{old}$ per $\delta t/\delta$ sec., added to $\vec{v}_{old}$ per $\Delta t$ on the average is an increment of:

$$\frac{2^{k'}(-\vec{x}_{old} + \vec{x}_1)\Delta t}{(\Delta t/\delta)} \cdot \Delta t = 2^{k'}(-\vec{x}_{old} + \vec{x}_1) \cdot \delta \cdot \Delta t \tag{50}$$

thereby to make an addition equivalent to the first side of the expression (48). Multiplication of t is replaced by shifting the multiplicand by setting $\Delta t = 2^{-N}$ (N: integer). Thus, obtained from the expressions (44) to (50) are the following expressions (51) and (52), additions of which may be repeated under the initial condition of the expression (53) at time intervals t with respect to position and $\Delta t/\delta$ with respect to velocity respectively:

$$\vec{x}_{new} = \vec{x}_{old} + \vec{v}_{old} \cdot \Delta t \tag{51}$$

$$\vec{v}_{new} = \vec{v}_{old} + 2^{k'}(-\vec{x}_{old} + \vec{x}_1) \cdot \Delta t \tag{52}$$

$$\vec{x}_{ini} = \vec{x}_0, \vec{v}_{ini} = \vec{0} \tag{53}$$

Figure 10:
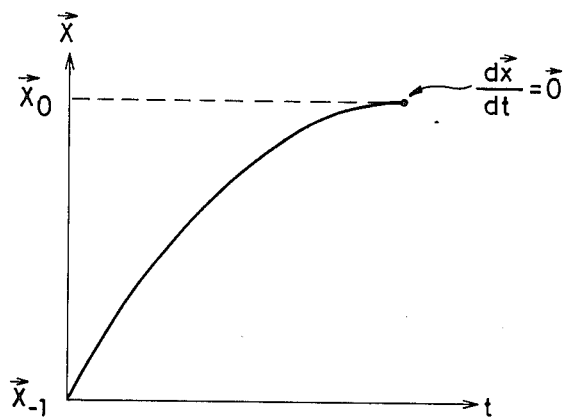

Description is now made on the method with respect to soft stopping. The condition in the soft stopping is that the work point passing through $\vec{x} = \vec{x}_{-1}$ at velocity $\vec{u}_{-1}$ is stopped at $\vec{x} = \vec{x}_0$ as shown in FIG. 10. In this case, the basis can be formed, similarly to the expression (36), by the following expression in which acceleration $\vec{a}(t)$ of the work point is proportional to the distance from the passage point $\vec{x}_{-1}$:

$$\vec{a}(t) = \frac{d\vec{v}(t)}{dt} = k^2(-\vec{x} + \vec{x}_{-1}) \tag{54}$$

in which $\vec{v}(t)$, k etc. are similar in significance to the above. Since the boundary condition is different from that of the soft starting, solutions of these differential equations are as follows:

$$\vec{x}(t) = (\vec{x}_0 - \vec{x}_{-1}) \sin(kt) + \vec{x}_{-1} \tag{55}$$

$$\vec{v}(t) = k(\vec{x}_0 - \vec{x}_{-1}) \cos(kt) \tag{56}$$

in which:

$$\vec{u}_{-1} = -k(\vec{x}_0 - \vec{x}_1) \tag{57}$$

$$kT = \pi/2 \tag{58}$$

Arithmetic of these expressions may also be replaced by the method of solving the differential equations by repeating additions similarly to the soft starting, thereby to obtain the following expressions (59) to (61) correspondingly to the expressions (51) to (53):

$$\vec{x}_{new} = \vec{x}_{old} + \vec{v}_{old} \cdot \Delta t \tag{59}$$

$$\vec{v}_{new} = \vec{v}_{old} + 2^{k'}(-\vec{x}_{old} + \vec{x}_{-1}) \cdot \Delta t \tag{60}$$

$$\vec{x}_{ini} = \vec{x}_{-1}, \vec{v}_{ini} = \vec{u}_{-1} \tag{61}$$

Also in this case, repetition of additions with respect to velocity is performed per $\Delta t/\delta$.

Figure 11:
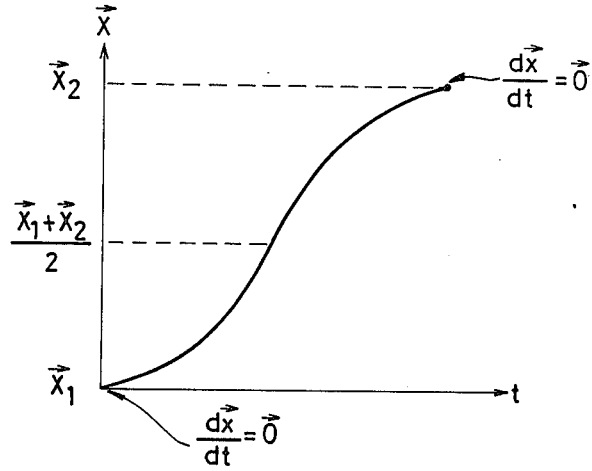

Consideration is now made on a case where the work point starts from one reference point and stops at a subsequent reference point. In this case, it is necessary to make the work point softly starting from $\vec{x} = \vec{x}_1$ softly stop at the next reference point $\vec{x} = \vec{x}_2$ as shown in FIG. 11. Employed here as an example is a method of minimizing acceleration $\vec{a}(t)$ of the work point at an intermediate position between the starting and stopping points and increasing acceleration $\vec{a}(t)$ as the work point is separated from the intermediate position. Therefore, the basic equation is as follows:

$$\vec{a}(t) = \frac{d\vec{v}(t)}{dt} = k^2\left(\vec{x} + \frac{\vec{x}_1 + \vec{x}_2}{2}\right) \tag{62}$$

in which:

$$kT = \pi \tag{62'}$$

This equation is solved as follows:

$$\vec{x}(t) = \frac{\vec{x}_1 - \vec{x}_2}{2} \cos(kt) + \frac{\vec{x}_1 + \vec{x}_2}{2} \tag{63}$$

$$\vec{v}(t) = -k \frac{\vec{x}_1 - \vec{x}_2}{2} \sin(kt) \tag{64}$$

Similarly to the above, expressions for repeating additions are as follows.

$$\vec{x}_{new} = \vec{x}_{old} + \vec{v}_{old} \cdot \Delta t \tag{65}$$

$$\vec{v}_{new} = \vec{v}_{old} + 2^{k'}\left(-\vec{x}_{old} + \frac{\vec{x}_1 + \vec{x}_2}{2}\right) \cdot \Delta t \tag{66}$$

$$\vec{x}_{ini} = \vec{x}_1, \vec{v}_{ini} = \vec{0} \tag{67}$$

Also in this case, repetition of additions with respect to velocity is performed per $\Delta t/\delta$. In this case, the maximum velocity is $-k(\bar{x}_1 - \bar{x}_2/2)$.

Figure 7:
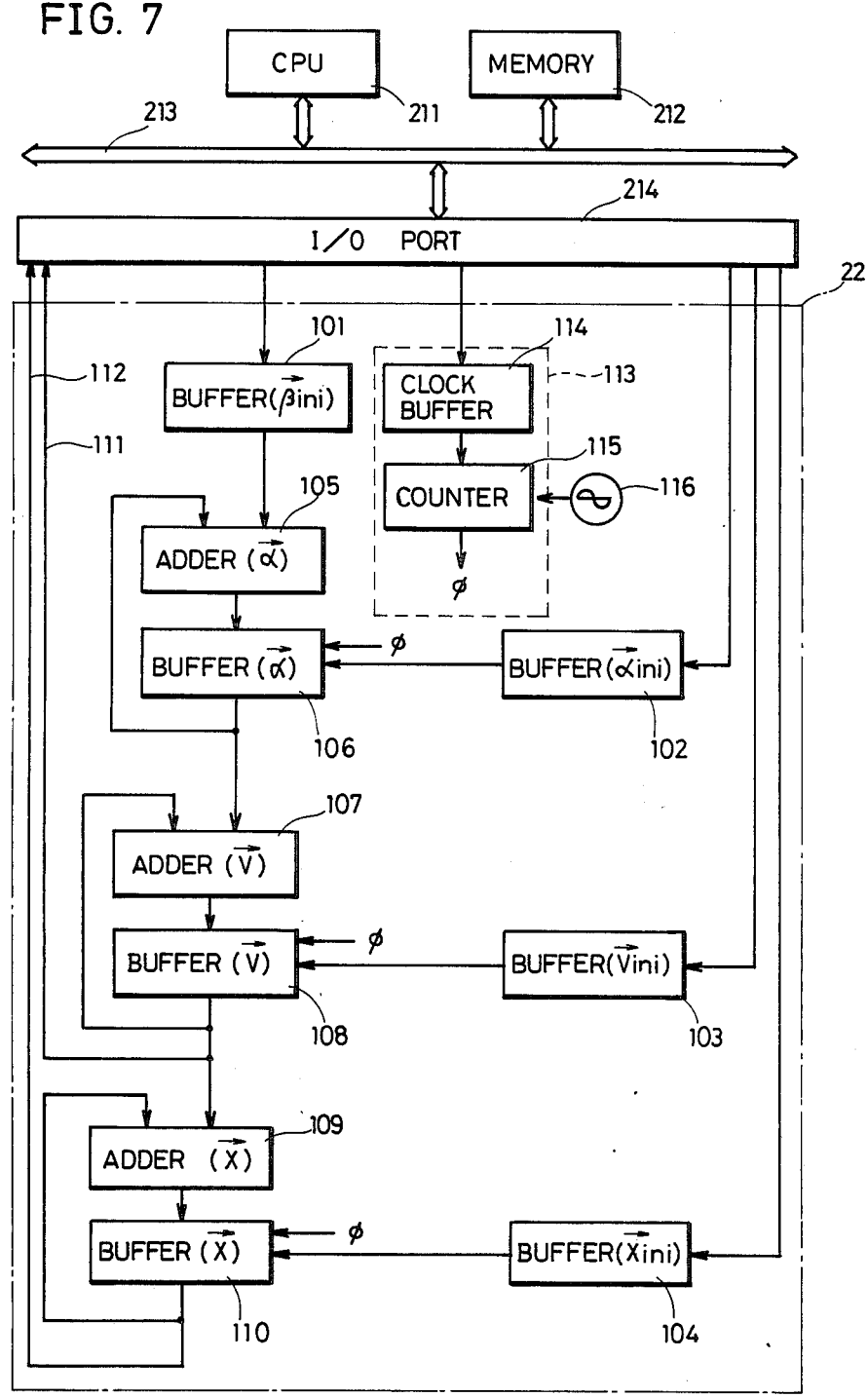
FIG. 7 is a block diagram showing an example of an interpolation circuit included in the first embodiment.
Figure 12:
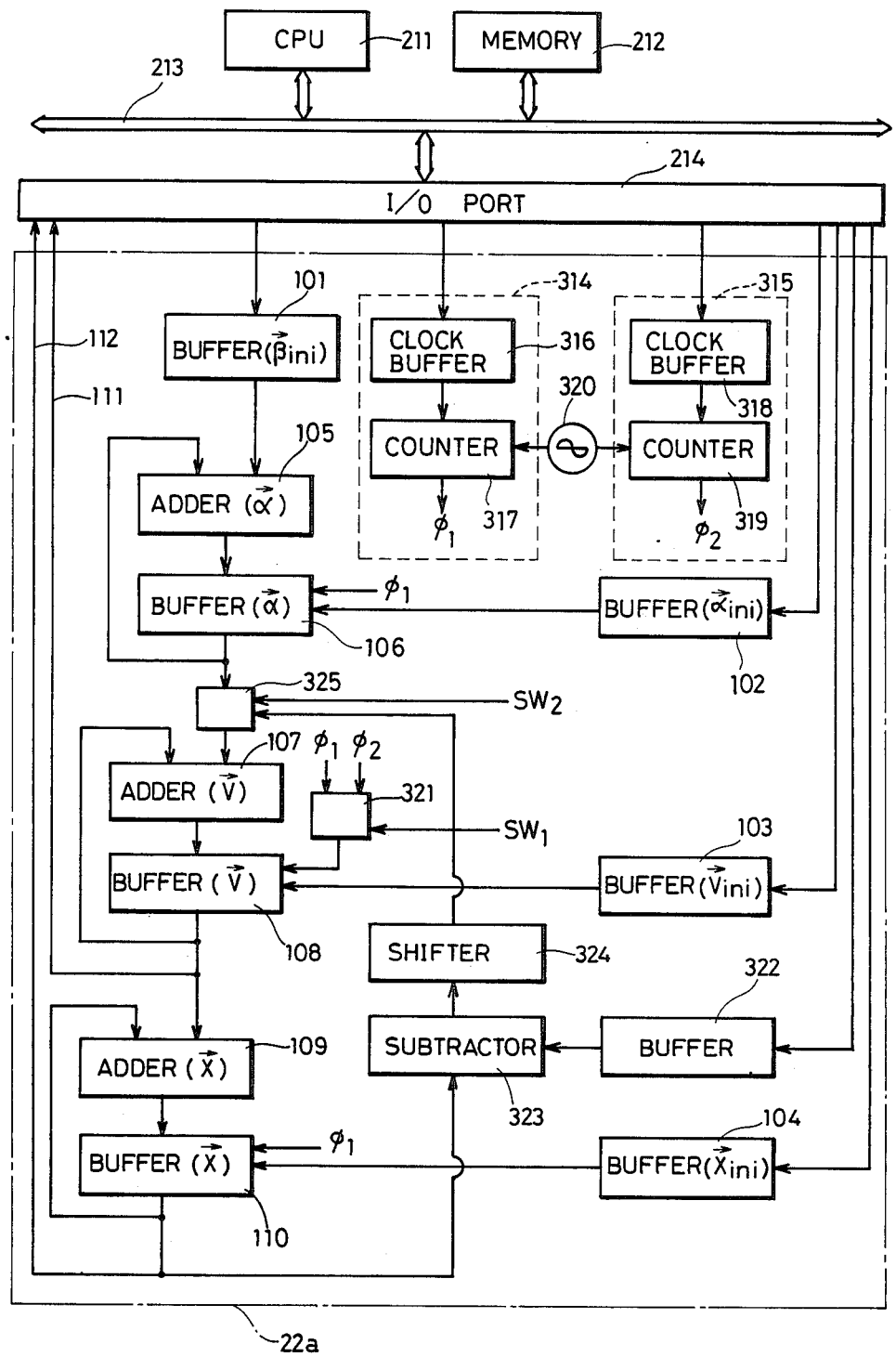
FIG. 12 is a block diagram showing an interpolation circuit employed in third embodiment.

FIG. 12 shows an interpolation circuit 22a which can perform control of the aforementioned soft starting and soft stopping and interpolation control by the expression (5) in a combined manner. This interpolation circuit 22a corresponds to the interpolation circuit 22 as shown in FIG. 7, and within circuit elements etc. included therein, components identical to those in FIG. 7 are indicated by the same reference numerals. Further, within the structural elements of the control unit, portions other than the interpolation circuit 22a are similar to those shown in FIG. 5, and hence repeated description is omitted.

The interpolation circuit 22a as shown in FIG. 12 is different from the interpolation circuit 22 of FIG. 7 in the following points: First, it is provided with a first clock generator circuit 314 which generates a clock signal $\phi_1$ per $\Delta t$ ($=2^{-10}$ sec) and a second clock generator circuit 315 which generates a clock signal $\phi_2$ per $\Delta t/\delta$ ($=2^{-10}/\delta$ sec). The first clock generator circuit 314 includes a first clock buffer 316 which receives the value $\Delta t$ from a memory 212 thereby to buffer the same and a first counter 317 which receives respective outputs from the first clock buffer 316 and a timer 320 thereby to output the first clock signal $\phi_1$. Similarly, the second clock generator circuit 315 includes a second clock buffer 318 which receives the value $\Delta t/\delta$ from the memory 212 and a second counter 319 which receives respective outputs from the second clock buffer 318 and the timer 320 to output the second clock signal $\phi_2$. These clock generator circuits 314 and 315 respectively generate carry signals of the first and second counters 317 and 319 per time $\Delta t$ and $\Delta t/\delta$ repsectively as the clock signals $\phi_1$ and $\phi_2$. Therefore, the first clock signal $\phi_1$ functions in the same manner as the clock $\phi$ as shown in FIG. 7. The first clock signal $\phi_1$ is directly supplied to buffers 106 and 110, while being supplied to a buffer 108 through a multiplexer 321. The second clock signal $\phi_2$ is supplied as the other input of the multiplexer 321, which in turn selects either clock signal $\phi_1$ or $\phi_2$ by a switching signal Sw$_1$ from the CPU 211, thereby to supply the same to the buffer 108.

The output from the buffer 110 is supplied as one input of a subtractor 323 in addition to the adder 109 and the I/O port 214. The output of a buffer 322, which is connected to the I/O port 214, is supplied as the other input of the subtractor 323. The output of the subtractor 323 is supplied as one input of a multiplexer 325 through a shifter 324 which shifts the input signal by k' bits to the higher order side to output the same. The multiplexer 325 receives the output of the buffer 106 as its other input, and selects either one of the two inputs by a switching signal Sw$_2$ from the CPU 211 thereby to supply the same to the adder 107. Other structure is similar to that of the interpolation circuit 22 as shown in FIG. 7.

Description is now made on operation for control performed by the interpolation circuit 22a as shown in FIG. 12 in order of soft starting→interpolation based on the expression (15)→soft stopping. First, in the soft starting, the multiplexer 321 selects the input from the second clock generator circuit 315 by the switching signal Sw$_1$. Then the buffer 108 receives the second clock signal $\phi_2$. Further, the multiplexer 325 selects the input from the shifter 324 by the switching signal Sw$_2$. Thus, the adder 105 and the buffer 106 etc. have no relation to the operation of this circuit. Zero as the initial velocity value $\bar{v}_{ini}$ and the position $\bar{x}_0$ of the first reference point as the initial position value $\bar{x}_{ini}$ are input from the CPU 211 to the buffers 103 and 104 respectively (refer to expression (53)). The buffer 322 receives the position $\bar{x}_1$ of the subsequent reference point from the CPU 211.

Then, $\bar{v}_{ini}$ and $\bar{x}_{ini}$ are respectively transferred to the buffers 108 and 110. When the clock signal $\phi_2$ is supplied, the buffer 108 supplies $\bar{v}_{ini}$ stored therein to the adder 107. Simultaneously with this, $\bar{v}_{ini}$ is also supplied to the adder 109. On the other hand, $\bar{x}_{ini}$ stored in the buffer 110 is supplied to the adder 109, to be added up with a signal obtained by shifting $\bar{v}_{ini}$ to the lower order side by 10 bits. Therefore, the adder 109 performs addition ($\bar{x}_{ini} + \bar{v}_{ini} \cdot \Delta t$).

$\bar{x}_{ini}$ output from the buffer 110 is also supplied to the subtractor 323. The subtractor 323 subtracts $\bar{x}_{ini}$ from $\bar{x}_1$ output from the buffer 322, thereby to supply ($-\bar{x}_{ini} + \bar{x}_1$) to the shifter 324. The shifter 324 shifts this signal by k' bits to the higher order side to supply the same to the multiplexer 325. Thus, the other input of the adder 107 is $2^{k'} \cdot (-\bar{x}_{ini} + \bar{x}_1)$. The adder 107 shifts this input to the lower order side by 10 bits, to add up the same with $\bar{v}_{ini}$ output from the buffer 108. Therefore, the output from the adder 107 is $v_{ini} + 2^{k'} \cdot (-x_{ini} + x_1)\Delta t$. The buffer 108 buffers the output of the adder 107 as $\bar{v}_{old}$ in the subsequent cycle of the second clock signal $\phi_2$. The adder 107 and the buffer 108 repeat similar operations in respective cycles of the second clock signal $\phi_2$. Therefore, assuming that the values stored in the buffers 108 and 110 are respectively represented by $\bar{v}_{old}$ and $\bar{x}_{old}$, the adder 107 performs arithmetic on the expression (52) to find $\bar{v}_{new}$, thereby to supply the same to the buffer 108. This $\bar{v}_{new}$ is processed as $\bar{v}_{old}$ in the subsequent cycle. Similarly, the adder 109 and the buffer 110 repeat arithmetic of the expression (51) along the cycle of the firt clock signal $\phi_1$.

Since the two signals $\phi_1$ and $\phi_2$ are employed as the clock signals, the expressions (51) and (52) are repsectively subjected to arithmetic in different cycles. Therefore, when, for example, $\phi_1 < \phi_2$, repetition with respect to velocity is performed slower than that with respect to position whereby the number of additions is decreased, whereas the velocity command value and position command value actually output respectively from the buffers 108 and 109 are appropriate as command values at the point of time since the increment of the velocity per repetition is frequent as hereinabove described with reference to the expression (52).

When control of the soft starting is terminated and the process is advanced to the control based on the expression (5), the multiplexer 321 selects the first clock generator circuit 314 side by the switching signal Sw$_1$, and the multiplexer 325 selects the output side of the buffer 106 by the switching signal Sw$_2$. Then the interpolation circuit 22a as shown in FIG. 12 presents substantially identical structure to the interpolation circuit 22 as shown in FIG. 7, thereby to perform the interpolation arithmetic based on the expression (5).

In order to perform soft stopping, the switching signals Sw$_1$ and Sw$_2$ make the multiplexers 321 and 325 enter the same states as in the aforementioned soft starting. The initial values supplied to the buffers 103 and 104 are $\bar{u}_{-1}$ and $\bar{x}_{-1}$ respectively, and the buffer 322 receives $\bar{x}_{-1}$ (refer to expressions (59) to (61)). Operation thereafter is similar to that in the soft starting.

In order to continuously perform the soft starting and the soft stopping, the values obtained from the expressions (67) may be respectively supplied to the buffers 103 and 104 as initial values, while supplying $(\tilde{x}_1+\tilde{x}_2/2)$ to the buffer 322. Also in this case, operation of this circuit is similar to the above.

The aforementioned concepts of the starting and stopping points are extended in a case where velocity data with respect to at least one of adjacent reference points along the sequence is substantially zero.

G.

Fourth Embodiment

Description is now made on a fourth embodiment employing an interpolation circuit (FIG. 13) which performs only soft starting and soft stopping. An interpolation circuit 22b in the fourth embodiment is substantially similar to that in the third embodiment (FIG. 12), except that circuit elements for performing interpolation arithmetic based on the expression (5), i.e., the buffers 101, 102 and 106, the adder 105 and the multiplexers 321 and 325 are omitted. Further, a clock $\phi_1$ is supplied to a buffer 110 and a clock $\phi_2$ is supplied to a buffer 108 respectively.

Thus, applicable to this embodiment is the aforementioned description of the third embodiment with respect to the operations for performing soft starting and soft stopping, and hence repeated description is omitted. Interpolation arithmetic of an intermediate section in this embodiment is performed by a CPU 211 employing in arbitrary interpolation method.

Figure 14:
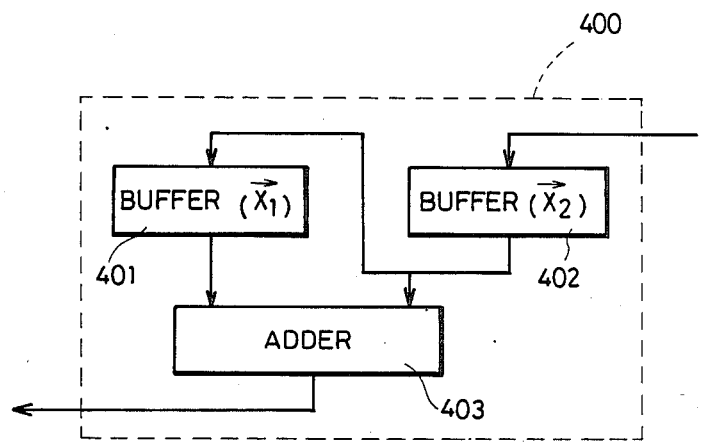
FIGS. 13 and 14 are block diagrams showing interpolation circuits employed in the fourth embodiment.
Figure 13:
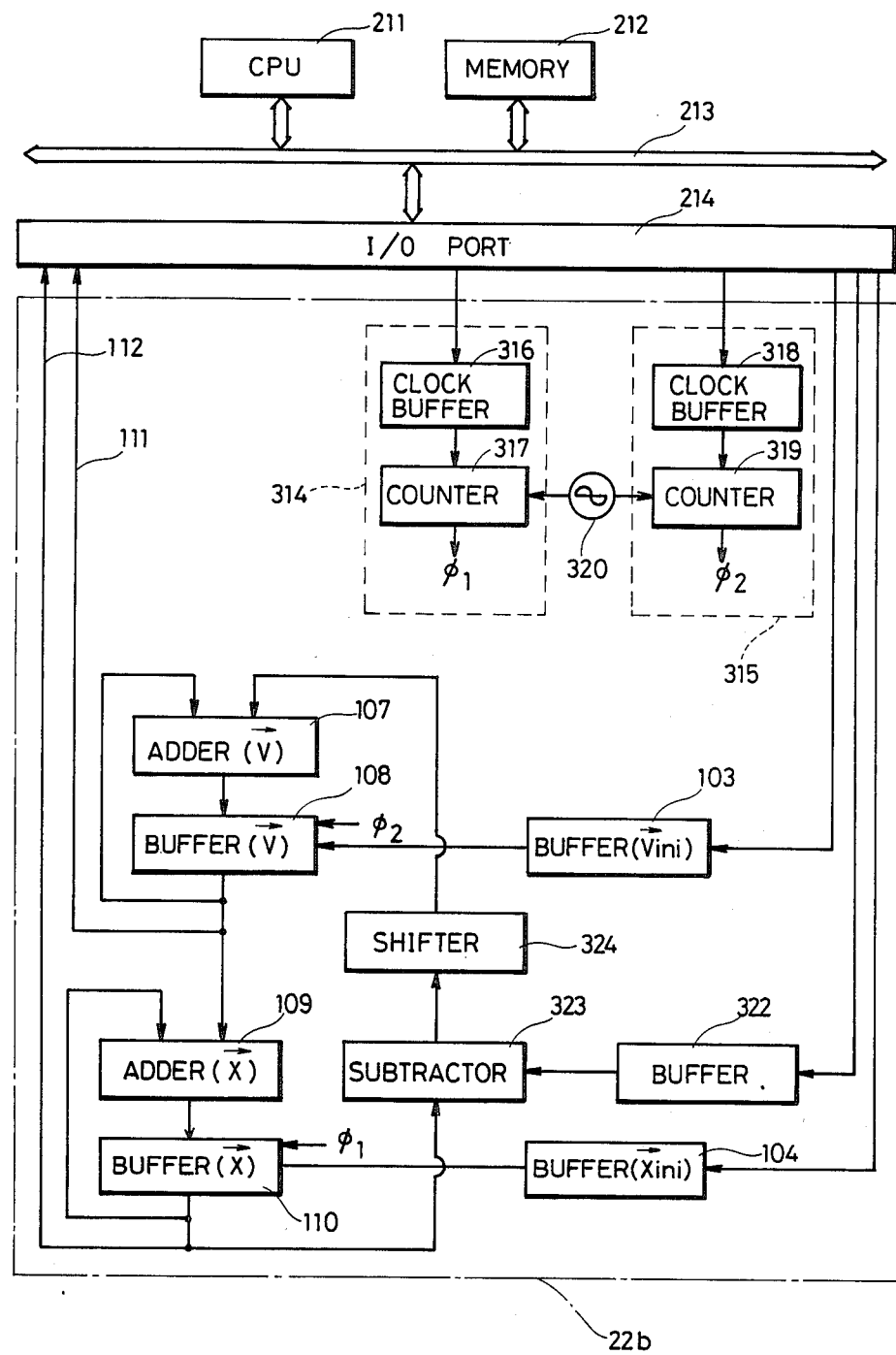

The example as shown in FIG. 13 is so structured that the CPU 211 calculates value $(\tilde{x}_1+\tilde{x}_2/2)$ appearing in the expression (66) by employing data of $\tilde{x}_1$ and $\tilde{x}_2$ from a memory 212. However, when a prescribed position arithmetic circuit 400 as shown in FIG. 14 is substituted for a buffer 322 in FIG. 13, such arithmetic may not be performed by the CPU 211. The prescribed position arithmetic circuit 400 includes buffers 401 and 402 for respectively buffering the values of $\tilde{x}_1$ and $\tilde{x}_2$ received through an I/O port 214 from the memory 212 and an adder 403 for shifting respective outputs of the buffers 401 and 402 respectively by one bit to the lower order side thereby to add up the same. In such a circuit, first the value $\tilde{x}_1$ is buffered by the buffer 402, thereby to be transferred to the buffer 401 at the next step while the value $\tilde{x}_2$ is input in the buffer 402. Then, respective outputs $\tilde{x}_1$ and $\tilde{x}_2$ from these buffers 401 and 402 are supplied to the adder 403. Accordingly, the adder 403 outputs value $(\tilde{x}_1+\tilde{x}_2/2)$ obtained by shifting and addition, to supply the same to a subtractor 323 as shown in FIG. 13. Other operations are similar to those of the circuit as shown in FIG. 13.

Such interpolation arithmetic is thus performed thereby to obtain smooth the locus of the work point as indicated by curves shown in FIGS. 9 to 11. Thus, largely eased are impacts in starting and stopping. Further, the interpolation arithmetic can be performed at a high speed by employing the differential equations as the basis.

H.

Supplementation

Although the control operation in the respective one of the aforementioned embodiments is performed on the basis of specific interpolation function, interpolation functions having other functional forms can also be employed, as hereinabove described. Repeated arithmetic is enabled on the basis of differential equations whose solution is the interpolation function, which is not directly calculated, thereby to enable high-speed arithmetic control by additions. The aforementioned differential equations can be solved only by shifting operation and additions by setting the repetition time as $2^{-N}$ (N: integer)sec., thereby to obtain arithmetic control at a higher speed, while the interpolation control according to the present invention does not necessarily require introduction of such repetition time. In the first to third embodiments, directions of velocity in positions such as the reference points to be passed by the work point are not necessarily selected as those illustrated in the embodiments, and may be obtained by, e.g., in the reference point $\tilde{x}_i$, differently weighting directions of $\overrightarrow{x_{i-1}x_i}$ and $\overrightarrow{x_ix_{i+1}}$ and averaging the same. Such selection is effective in a case where the curvature of a locus to be defined by the work point is simply increased or decreased from the starting point to the stopping point (e.g., helicoidal shape).

The interpolation method forming the basis of the present invention may be independently employed, and, in addition to the soft starting and soft stopping, the present invention includes common employment with any other interpolation methods such as linear interpolation, circular interpolation and Hosaka's interpolation.

Further, the control method according to the present invention may be applied to control of other types of robots such as a numerical control robot, in addition to the playback robot.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A robot control method for making a work point of a robot having a driving mechanism perform movement to pass prescribed discrete passage points in a prescribed sequence, said method comprising the steps of:
    preparing positional data expressing respective positions of said passage points and velocity data expressing the magnitude of the velocity at which said work point is to pass respective said passage points;
    finding interpolation data having a positional coordinate value interpolating said movement of said work point between said passage points on the basis of said positional data and said velocity data in each prescribed time interval; and
    outputting a command signal to said driving mechanism on the basis of said interpolation data,
    said interpolation data being found on the basis of a condition that said work point passes through each of said passage points at a velocity having a magnitude dependent on said velocity data and directions dependent on the relation between respective directions of two vectors obtained by sequentially connecting the noted passage point and two passage points adjacent thereto along said prescribed sequence.

2. A robot control method in accordance with claim 1, wherein:
    said interpolation data are determined on the basis of a positional interpolation function expressed as a third or higher order polynomial with respect to a time parameter.

3. A robot control method in accordance with claim 2, wherein:
said positional interpolation function expressed by said polynomial satisfies a differential equation with respect to said time parameter, said interpolation data being determined on the basis of said differential equation.

4. A robot control method in accordance with claim 3, wherein:
said prescribed time interval is $2^{-N}$ sec., N being an integer, and said differential equation is approximated by a repeating arithmetic expression, the value of which is updated each said prescribed time interval, said repeating arithmetic expression including a multiplication of a multiplicand by said prescribed time interval and an addition of the result of said multiplication to an augend, the arithmetic according to said repeating arithmetic expression being performed by shifting said multiplicand by N bits to the lower order side thereby to add the same to said augend.

5. A robot control method for making a work point of a robot having a driving mechanism perform movement of passing prescribed discrete passage points in a prescribed sequence, said method comprising the steps of:
preparing positional data expressing respective positions of said passage points and velocity data expressing the magnitude of the velocity at which said work point is to pass respective ones of said passage points;
finding interpolation data having a positional coordinate value interpolating said movement of said work point between said passage points on the basis of said positional data and said velocity data in each prescribed time interval; and
outputting a command signal to said driving mechanism on the basis of said interpolation data,
said interpolation data being first interpolation data found on the basis of a condition that said work point passes through said passage points at a velocity having a magnitude dependent on said velocity data and directions dependent on the relations between those of said positional data respectively expressing a plurality of said passage points sequent along said prescribed sequence, and
when the value of said velocity data with respect to at least one of two passage points adjacent along said prescribed sequence is substantially zero, said interpolation data between said two adjacent passage points is second interpolation data found so that acceleration of said work point is changed in correlation to the distance from a prescribed position.

6. A robot control method in accordance with claim 5, wherein:
said first interpolation data is determined on the basis of a positional interpolation function expressed as a third or higher degree polynomial with respect to a time parameter.

7. A robot control method in accordance with claim 6, wherein:
said positional interpolation function expressed by said polynomial satisfies a first differential equation with respect to said time parameter, said first interpolation data being determined on the basis of said first differential equation, and
said second interpolation data being determined on the basis of a second differential equation describing said correlation.

8. A robot control method in accordance with claim 7, wherein:
said prescribed time interval is $2^{-N}$ sec., N being an integer, and said first differential equation is approximated by a repeating arithmetic expression, the value of which is updated per said prescribed time interval, said repeating arithmetic expression including a multiplication of a multiplicand by said prescribed time interval by and an addition of the result of said multiplication to an augend, the arithmetic according to said repeating arithmetic expression being performed by shifting said multiplicand by N bits to the lower order side thereby to add the same to said augend,
said second differential equation being solved by combination of respective repeating arithmetic by said prescribed time interval and another time interval different from said prescribed time interval, said repeating arithmetic being performed by a shifting arithmetic and an addition.

9. A robot control method for making a robot having a driving mechanism perform movement to pass prescribed discrete passage points in a prescribed sequence, said method comprising the steps of:
preparing positional data expressing respective positions of said passage points and velocity data expressing the velocity at which said work point is to pass respective ones of said passage points;
finding interpolation data shown having a positional coordinate value interpolating said movement of said work point between said passage points on the basis of said positional data and said velocity data in each prescribed time interval; and
outputting a command signal to said driving mechanism of the basis of said interpolation data,
when the value of said velocity data with respect to at least one of two passage points adjacent along said prescribed sequence is substantially zero, said interpolation data between said two adjacent passage points being found on a condition that acceleration of said work point is changed in correlation to the distance from a prescribed position.

10. A robot control method in accordance with claim 9, wherein:
said interpolation data is determined on the basis of a prescribed differential equation,
said prescribed time interval including a first time interval and a second time interval different from said first time interval, said differential equation being solved by combination of repeating arithmetic by respective said first and second time intervals.

11. A Robot control method in accordance with claim 10, wherein:
said first time interval is $2^{-N}$ sec., N being an integer, and said second time interval is determined in relation to said first time interval, said repeating arithmetic being performed by a shifting arithmetic and an addition.

* * * * *